UNITED STATES PATENT OFFICE.

ALEXANDER H. KERR, OF PORTLAND, OREGON.

COMPOSITION FOR SEALING PRESERVING-JARS AND OTHER PURPOSES.

No. 930,482.　　　Specification of Letters Patent.　　Patented Aug. 10, 1909.

Application filed November 14, 1908. Serial No. 462,598.

*To all whom it may concern:*

Be it known that I, ALEXANDER H. KERR, a citizen of the United States, and a resident of Portland, in the county of Multnomah and State of Oregon, have invented a new and useful Composition for Sealing Preserving-Jars and other Purposes, of which the following is a specification.

The principal object of the present invention is to provide a composition which shall not be materially affected by the action of the air; which shall be comparatively soft at ordinary temperatures and not too firm or brittle when cool; which shall cool fairly slowly; which shall be tough and somewhat elastic and adhesive and cementing; which shall resist corrosive alkalies, most acids, oils and all food acids, and which shall be plastic at a little above and soft yet firm at ordinary temperatures, and which possessed of these qualities in whole or in part, is well adapted for use in connection with or adherence to metallic or other caps or lids for preserving vessels or fruit jars and for use in other relations and connections.

A composition of my invention comprises balata along with other compounding substances, thus making a composition which is quite homogeneous and plastic at a moderate heat, under that of boiling water, and quite tough yet not brittle and somewhat soft at the ordinary atmospheric temperature. The composition is of gripping quality, acid proof, oil proof, flexible, plastic, water proof, air proof, insect proof, and durable, and is capable of being applied to many purposes in the commercial arts; furthermore it is comparatively inexpensive.

In application to jars or preserving packages of various kinds, my composition makes a hermetically air tight seal. It is free from unpleasant odor or taste and will not taint or affect the flavor of the contents of any preserving vessels or fruit jars, it will not deteriorate or become brittle and it is sanitary and unattackable by food acids, as well as by oils. The latter property renders the composition especially applicable and of great merit for use in connection with packing oily fish, sardines, etc. Balata is relatively inexpensive and is possessed of the qualities above recited and it imparts them to the composition. Balata does not, under the influence of air, become hard and brittle or resinous and remains quite unaffected for a long time and it is plastic at about 125° F. The composition at a comparatively low temperature will, when used in connection with or attached to the lids or covers of fruit jars or preserving vessels, fill and seal not only the space between the vessels or jars and covers or lids, but also spaces due to ordinary inequalities or imperfections. This quality is advantageous whether the vacuum sealing be practiced hot or cold; that is to say, whether the vacuum be created by means of a pump or the like, or whether the vacuum be created by the cooling of the previously heated contents of the jar or vessel. Balata cools slowly and thus there is, when the composition is used in or in connection with the lids or covers of jars or vessels into which the contents are placed hot and permitted to cool to form a vacuum, sufficient time for the accomplishment of the complete sealing of the vessels or jars; it being understood that the composition is in this instance heated by heat imparted by the contents of the jar or other vessel.

Balata when cooled does not become too firm or brittle, which is advantageous when it is used in a composition applied to or used in connection with the covers of fruit jars or preserving vessels, since the latter are often exposed to comparatively low temperatures. Balata in my composition enables the composition to withstand comparatively high temperatures of which 212° F. is an example, without becoming more than usefully plastic.

The principal ingredient of the compound is balata, but the best results are obtained by its use in admixture with compounding materials. These added ingredients should, of course like balata itself, be inert in the sense of not being deleterious under conditions of the use or uses to which the compound may be put and these ingredients may be varied widely. Examples of compounding materials are barytes, magnesia, lithopone, powdered charcoal, asbestos, oxid of zinc, aluminum flakes and pulverized chalk, either singly or in combination. The proportions may be varied according to the intended use, but an example of proportions suitable for jars or preserving lids or covers, is by weight balata 30%, compounding materials 70%. The compounding materials, as I have said, may be varied, but examples thereof are, having reference to the total percentage of the composition, barytes 55% and asbestos 15%. Among the functions of the compounding material or materials the following may be mentioned: At ordinary temperature or at comparatively low temperatures the compounding material or materials impart to the composition flexibility, and at high temperatures they impart to it the appropriate coherence or consistency, for giving it the necessary body to cause it to operate properly as a sealing compound without being too soft.

As I have already stated the compounding materials may be varied widely both in character and in quantity and I do not confine myself to the use of a combination of them, or to the proportions as set forth of either balata or compounding materials.

The ingredients of this composition may be brought into a homogeneous plastic state by means of mixing rollers and other appropriate means and worked up into the form of washers, gaskets, or other articles adapted to the intended use. Since the ingredients are mechanically mixed the composition may be said to be raw in the sense that it is not vulcanized.

What I claim is:

1. A plastic raw sealing composition consisting of balata and a compounding material, and soft and coherent and adhesive when hot and flexible when cold, substantially as described.

2. A plastic raw sealing composition consisting of balata and a compounding material including asbestos and an inert substance, and coherent and adhesive when hot and flexible when cold, substantially as described.

3. A plastic raw sealing composition consisting of balata, and compounding material in sufficient proportions for imparting to the composition flexibility at relatively low temperatures and appropriate coherence at relatively high temperatures, substantially as described.

In testimony whereof I have hereunto signed my name in the presence of witnesses.

ALEXANDER H. KERR.

Witnesses:
A. SECHTEM,
J. H. ALLEN.